United States Patent
Narula et al.

(10) Patent No.: US 11,601,355 B2
(45) Date of Patent: Mar. 7, 2023

(54) CONTEXTUAL BANDWIDTH MANAGEMENT OF AUDIO/VIDEO CONFERENCE

(71) Applicant: DELL PRODUCTS L.P., Round Rock, TX (US)

(72) Inventors: Harpreet Narula, Austin, TX (US); Srikanth Kondapi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 37 days.

(21) Appl. No.: 17/203,444

(22) Filed: Mar. 16, 2021

(65) Prior Publication Data

US 2022/0303205 A1  Sep. 22, 2022

(51) Int. Cl.
*H04L 43/0894* (2022.01)
*H04L 12/18* (2006.01)
*H04L 65/403* (2022.01)
*H04L 65/65* (2022.01)
*H04L 65/70* (2022.01)
*H04L 41/5009* (2022.01)
*H04L 65/80* (2022.01)

(52) U.S. Cl.
CPC ...... *H04L 43/0894* (2013.01); *H04L 12/1827* (2013.01); *H04L 41/5009* (2013.01); *H04L 65/403* (2013.01); *H04L 65/65* (2022.05); *H04L 65/70* (2022.05); *H04L 65/80* (2013.01)

(58) Field of Classification Search
CPC ..... H04L 43/0894; H04L 65/70; H04L 65/65; H04L 12/1827; H04L 41/5009; H04L 65/403; H04L 65/80
See application file for complete search history.

(56) References Cited

U.S. PATENT DOCUMENTS

| | | | |
|---|---|---|---|
| 6,922,718 B2 | 7/2005 | Chang | |
| 8,060,054 B1 * | 11/2011 | Dinan | H04W 52/0216 455/574 |
| 2008/0056302 A1 * | 3/2008 | Erdal | H04L 65/65 370/474 |
| 2009/0147787 A1 * | 6/2009 | Arulambalam | H04L 65/613 370/392 |

(Continued)

*Primary Examiner* — Chris Parry
*Assistant Examiner* — Steven C Nguyen
(74) *Attorney, Agent, or Firm* — Larson Newman, LLP (57) ABSTRACT

An information handling system includes a network hardware device and a processor. The network hardware device transmits Internet Protocol (IP) datagram packets. Each of the IP datagram packets includes a respective user datagram protocol (UDP) packet. The processor detects a UDP packet. The UDP packet includes a real-time protocol (RTP) packet. The processor inspects one or more fields of the RTP packet, and determines whether a conferencing application generated the RTP packet. In response to a conferencing application generating the RTP packet, the processor determines whether the RTP packet is a real-time audio/video packet, and determines whether an audio/video session is in-progress. In response to the audio/video session being in-progress, the processor determines a network traffic policy for the RTP packet, and the network hardware device to transmit the UDP packet encapsulating the RTP packet based on the determined network traffic policy.

20 Claims, 5 Drawing Sheets

(56) References Cited

U.S. PATENT DOCUMENTS

| | | | |
|---|---|---|---|
| 2012/0051260 A1* | 3/2012 | Tamaki | H04W 24/02 370/253 |
| 2013/0272121 A1* | 10/2013 | Stanwood | H04L 47/805 370/230 |
| 2016/0043910 A1 | 2/2016 | Khosrowpour et al. | |
| 2016/0056927 A1* | 2/2016 | Liu | H04N 21/64776 370/216 |
| 2017/0054520 A1* | 2/2017 | Kwak | H04N 21/814 |

* cited by examiner

CONTEXTUAL BANDWIDTH MANAGEMENT OF AUDIO/VIDEO CONFERENCE

FIELD OF THE DISCLOSURE

The present disclosure generally relates to information handling systems, and more particularly relates to contextual bandwidth management of audio/video conference.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a network hardware device and a processor. The network hardware device may transmit Internet Protocol (IP) datagram packets. Each of the IP datagram packets includes a respective user datagram protocol (UDP) packet. The processor may detect a UDP packet. The UDP packet includes a real-time protocol (RTP) packet. The processor may inspect one or more fields of the RTP packet, and determine whether a conferencing application generated the RTP packet. In response to a conferencing application generating the RTP packet, the processor may determine whether the RTP packet is a real-time audio/video packet. In response to the RTP packet being a real-time audio/video packet, the processor may determine whether an audio/video session is in-progress. In response to the audio/video session being in-progress, the processor may determine a network traffic policy for the RTP packet, and the network hardware device may transmit the UDP packet encapsulating the RTP packet based on the determined network traffic policy.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
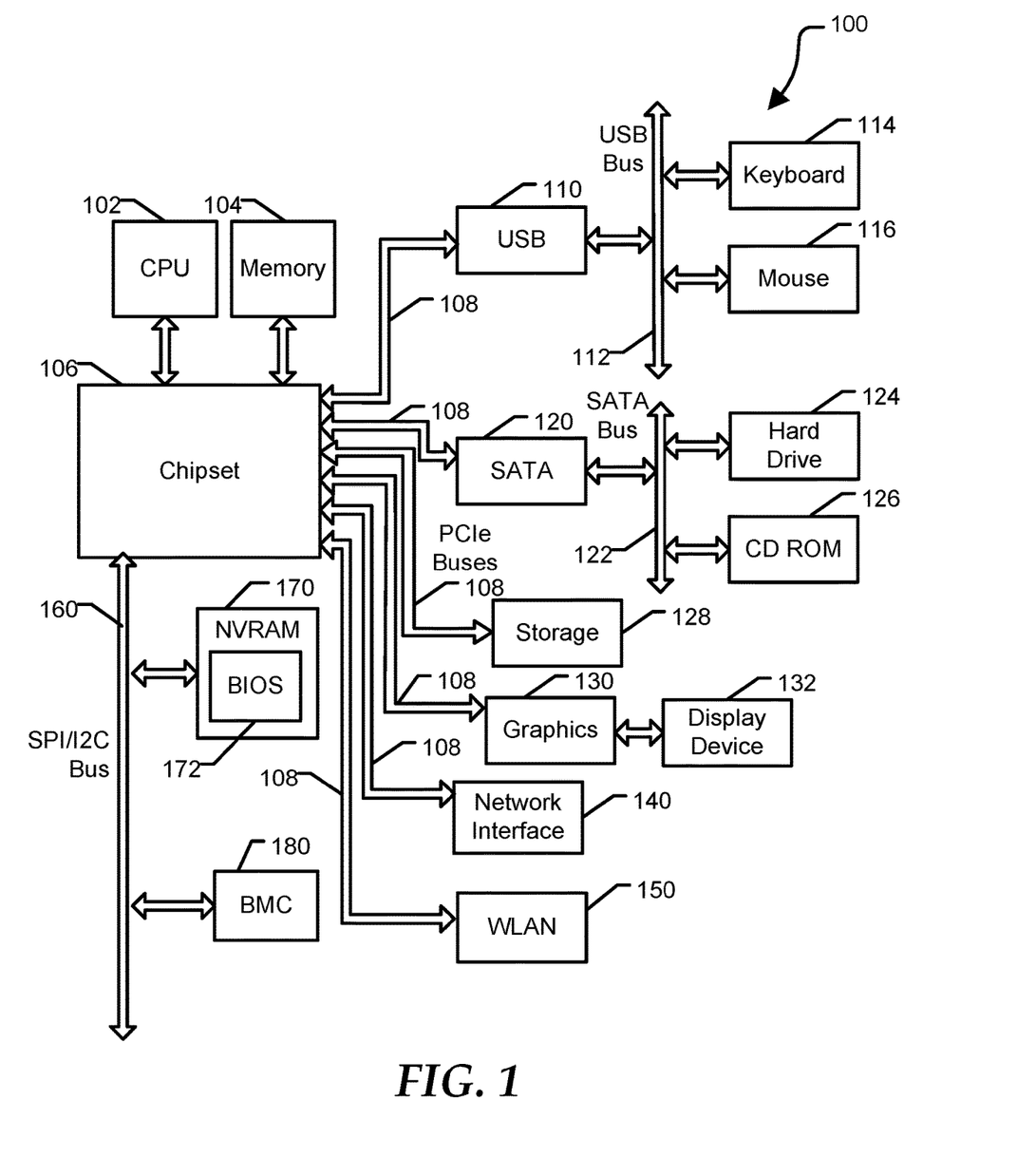
FIG. 1 is a block diagram of a general information handling system according to at least one embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a chipset 106, one or more PCIe buses 108, a universal serial bus (USB) controller 110, a USB bus 112, a keyboard device controller 114, a mouse device controller 116, a configuration a SATA bus controller 120, a SATA bus 122, a hard drive device controller 124, a compact disk read only memory (CD ROM) device controller 126, a storage 128, a graphics device controller 130, a network interface controller (NIC) 140, a wireless local area network (WLAN) or wireless wide area network (WWAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 2:
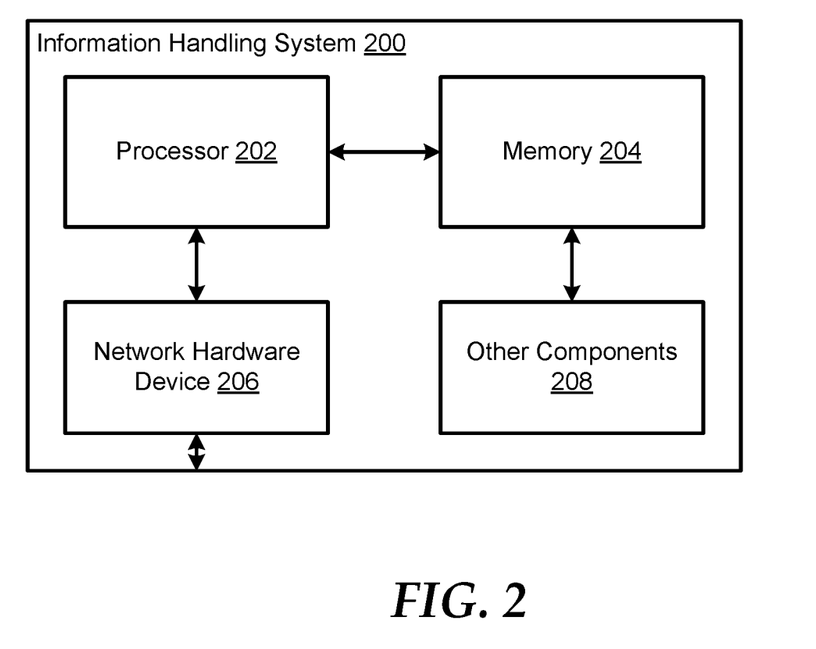
FIG. 2 is a block diagram of a portion of an information handling system according to at least one embodiment of the disclosure.

In an example, information handling system 100 may include any suitable device including, but not limited to, information handling system 200 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

FIG. 2 illustrates a portion of an information handling system 200 according to at least one embodiment of the disclosure. Information handling system 200 includes a processor 202, a memory 204, and other components 208. Processor 202 may access memory 204 to perform one or more suitable operations including, but not limited to, store and retrieve data, and execute one or more applications. In an example, processor 202 may communicate with network hardware device 206 to transmit data to other information handling systems connected to information handling system 200 via a network. In certain examples, other components 208 may include any additional suitable components of information handling system 200 without varying from the scope of this disclosure.

During operation, network hardware device 206 may communicate with any suitable device via Internet Protocol (IP) transmissions. In an example, information handling system 200 may be connect to the other devices or information handling systems via any suitable device including, but not limited to, a router and an access point. In certain examples, the IP communication may be via a wireless or wireless communication. When the communication is through a wireless-fidelity (Wi-Fi) connection, the bandwidth for the Wi-Fi connection may be limited, such that the throughput from information handling system 200 may be limited by a multiple device and multiple application environment.

In an example, different applications executed by processor 202 may have different requirements with respect to data transmission and reception. For example, an audio/video (A/V) conferencing application may need a reliable data transmission and reception even when the throughput of network hardware device 206 is limited. In an example, the limited throughput may result from any suitable event including, but not limited to, limited network bandwidth. In certain examples, data packets for the A/V conferencing applications may be allocated a particular amount of the network bandwidth to ensure proper data transmission and reception even when information handling system 200 has limited network bandwidth.

In previous information handling systems, a processor or network hardware device may tract tags without data packets to configure allocation of the network bandwidth. In an example, a tag within the data packet may identify a particular application providing the data packet. For example, each data packet provided by an A/V conferencing application may be tagged with an identifier for that particular A/V conferencing application. However, the A/V conferencing application may be continuously running in the background, such that the A/V conferencing application may continuously provide data packets with its associated tag. In certain examples, network hardware device 206 may prioritize data packets identified by the A/V conferencing application tag even when the conferencing application is not in a conferencing session. In these situations, background operations of the A/V conferencing application may utilize the limited bandwidth and thereby reduce the network bandwidth for other components of the information handling system. Information handling system 200 may be improve by processor 202 and network hardware device 206 determining whether a data packet is part of an active A/V conference session before prioritizing the data packet, and when the session is no longer active the data packet may no longer be prioritized as will be described with respect to FIGS. 3 and 4 below.

Figure 3:
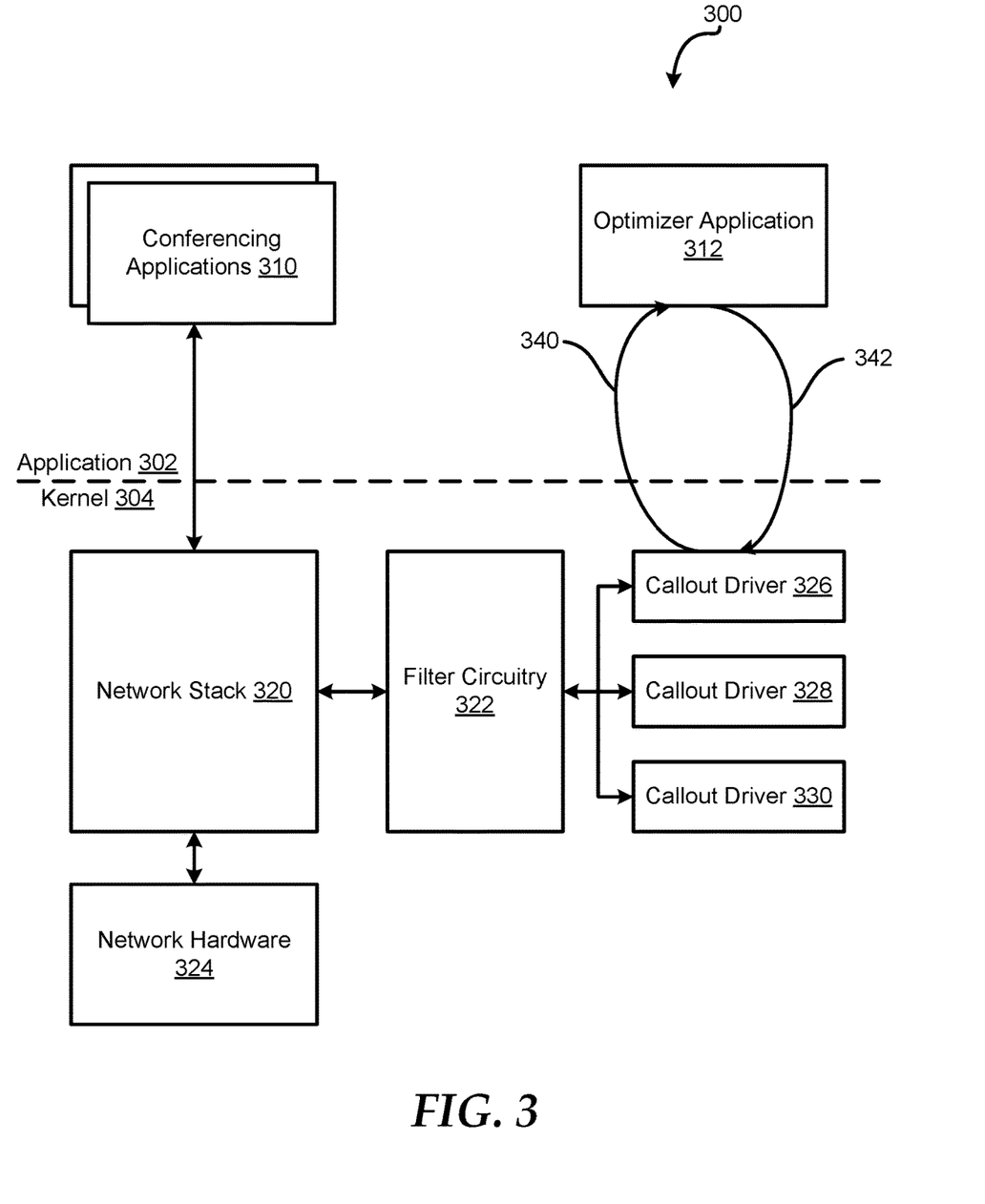
FIG. 3 is a block diagram of an application layer and kernel layer within a processor according to at least one embodiment of the disclosure.

FIG. 3 illustrates a processor 300 including an application layer 302 and kernel layer 304 according to at least one embodiment of the disclosure. Processor 300 may be substantially similar to processor 202 of FIG. 2. Application layer 302 includes conferencing applications 310 and an optimizer application 312. Kernel layer 304 includes a network stack 320, filter circuitry 322, a network hardware device 324, and callout drivers 326, 328, and 330. In an example, conferencing applications 310 may be any suitable conferencing application including, but not limited to, an A/V conferencing application. Network stack 320 may be stored within any suitable memory, such as memory 204 of FIG. 2. In an example, network hardware device 324 may be substantially similar to network hardware device 206 of FIG. 2.

During operation, processor 300 may execute one or more conferencing applications 310 within the application layer 302 of an operating system (OS). In certain examples, processor 300 may continuously execute these conferencing applications 310, which in turn may provide data packets to network stack 320 both during an active A/V conference session and when the conferencing applications are executed in the background of the OS. In these situations, network stack 320 may receive IP datagram packets from one of conferencing applications 310. In an example, a real-time protocol packet may be encapsulated within a user datagram protocol (UDP) packet, which in turn may be encapsulated within an IP datagram packet as shown in FIG. 4.

Figure 4:
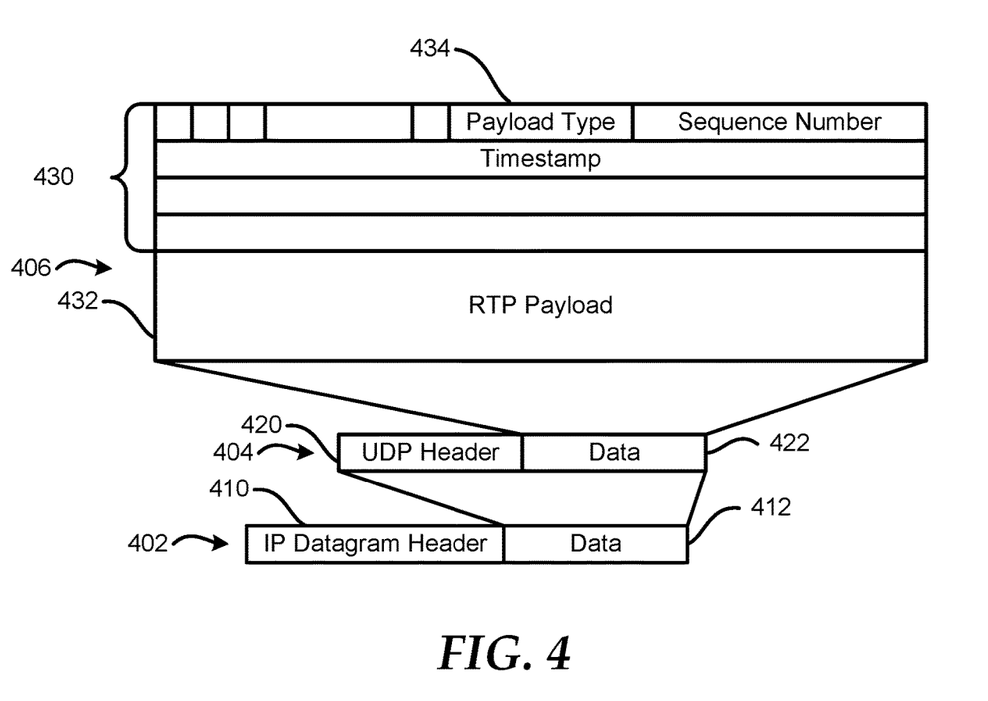
FIG. 4 is a diagram of data packets in an information handling system according to at least one embodiment of the present disclosure.

FIG. 4 illustrates an IP datagram packet 402, an UDP packet 404, and a RTP packet 406 according to at least one embodiment of the present disclosure. IP datagram packet 402 includes an IP datagram header 410 and data 412. IP datagram header 410 may identify the data packet in any suitable manner. Data 412 may include different data for IP datagram packet 402. In an example, UDP packet may be encapsulated within data 412 of IP datagram packet 410. Similarly, data 422 may include different data for UDP packet 404, and RTP packet 406 may be encapsulated within data 422 of the RTP packet. In an example, RTP packet 406 includes one or more suitable fields of data including, but not limited to, a RTP header 430, and a RTP payload 432. RTP header 430 includes one or more suitable fields of data including, but not limited to, a payload type 434, a sequence number, and a timestamp.

Referring back to FIG. 3, in response to network stack 320 receiving IP/UDP packet 402/404 from one of conferencing applications 310, components within kernel layer 304 may perform one or more suitable operations to determine whether RTP packet 406 encapsulated with the UDP/IP packets is to be prioritized. In certain examples, network stack 320 may provide full IP packet 402 to filter circuitry 322 or UDP packet 404 to the filter circuitry, which in turn may extract RTP packet 406 from within IP/UDP packet for further analysis. Network stack 320 may also extract RTP packet 406 from within IP/UDP packet 402/404 and may provide the extracted RTP packet to filter circuitry 322 for further analysis.

In an example, filter circuitry 322 may separate RTP packets 406 by the application providing the packet. For example, if a conferencing application 310 provided the RTP packet, filter circuitry may provide the RTP packet to callout driver 326. If another application executed by processor 300 provided RTP packet 406, filter circuitry may provide the packet to callout driver 328 or callout driver 330 for further processing.

In an example, callout driver 326 may perform one or more suitable operations on each RTP packet 406 received from filter circuitry 322. For example, callout driver 326 may inspect RTP packet 406 to determine a particular conferencing application 310 that generated the packet and to determine a type of RTP packet. If payload type field 434 of RTP packet 406 indicates that the RTP packet is an A/V type, callout driver 326 may perform one or more operations to determine whether to provide the RTP packet to optimizer application 312. In an example, callout driver 326 may track and inspect RTP packets 406 on a per conferencing application 310 basis.

In certain examples, callout driver 326 may keep a running count of A/V RTP packets. Callout driver 326 may determine whether the number of A/V RTP packets 406 received for a particular application exceeds a threshold number. In an example, the running count of A/V RTP packets 406 may be limited to a particular rolling time window. In response to the number of received A/V RTP packets 406 exceeding the threshold number, callout driver may determine that an A/V session is in-progress for the particular conferencing application 310.

In an example, callout driver 326 may utilize any suitable field within the packet to determine whether RTP packet 406 is an A/V packet. For example, callout driver 326 may inspect payload type field 434 to determine whether this field indicates that the RTP packet is an A/V packet. In an example, payload type field 434 may contain any suitable data to indicate whether RTP packet 406 is an A/V packet. For example, if payload type field 434 includes an A/V encoding scheme, callout driver 326 may determine that RTP packet is an A/V packet. In response to callout driver 326 determining that RTP packet 406 is an A/V packet, the callout driver may increment an RTP packet count for the particular application that generated the RTP packet.

Callout driver 326 may also utilize RTP payload 432 to determine whether RTP packet 406 is an A/V packet for an in-progress A/V conference session. In an example, RTP payload 432 may include data associated with a particular RTP session. For example, RTP packet 406 may establish an RTP session for audio and another RTP session for video. Callout driver 326 may inspect RTP payload 432 to determine whether RTP packet 406 includes an audio RTP session and a video RTP session. In response to RTP packet 406 including an audio RTP session and a video RTP session, callout driver 326 may determine the RTP packet is an A/V packet. In response to callout driver 326 determining that RTP packet 406 is an A/V packet, the callout driver may increment an RTP packet count for the particular application that generated the RTP packet.

In certain examples, payload type field 432 and RTP payload field 434 may be encrypted. In this situation, payload type field 432 and RTP payload field 434 may be decrypted so that the data in these fields may be used by callout driver 326. However, decrypting payload type field 432 and RTP payload field 434 may increase an amount of time to analyze RTP packet 406 and may increase an amount of power used by processor 300 as compared to utilizing other fields in the IP/UDP packet 402/404.

In this situation, callout driver 326 may inspect one or more other fields in IP/UDP packet 402/404 to determine whether the packet is real-time A/V traffic. For example, callout driver 326 may inspect UDP header 420 to determine whether the encapsulated RTP packet 406 is a real-time A/V packet. In an example, UDP header 420 may identify UDP port associated with encapsulated RTP packet 406 generated by conferencing application 310. In certain examples, conferencing applications 310 may utilize two particular UDP ports for A/V conference calls. For example, conferencing applications 310 may utilize the RTP port and the real-time control protocol (RTCP) port of network hardware device 324 to transmit A/V conference calls. In an example, both ports may be pre-configured to detect when an A/V conference call is established. If UDP header 420 identifies either RTP port or RTCP port as the port of network hardware device 324, callout driver 326 may determine that RTP packet 406 is an A/V packet. In response to callout driver 326 determining that RTP packet 406 is an A/V packet, the callout driver may increment an RTP packet count for the particular application that generated the RTP packet.

In an example, callout device 326 may inspect IP datagram header 410 of IP packet 402. In this example, IP datagram header 410 may be utilized to determine whether the encapsulated RTP packet 406 is a real-time A/V packet. For example, IP datagram header 410 may include data representing a layer 3 (L3) classification of real-time applications. In certain examples, conferencing applications 310 may configure DSCP codes within IP datagram header 410 to indicate RTP packet 406 is a high priority packet. Identification of a high priority packet may indicate real-time A/V traffic. Based on a combination of IP datagram header 410 identifying high priority packet and one of the other fields described herein indicating real-time A/V traffic, callout driver 326 may confirm that RTP packet 406 is a real-time A/V packet. If IP datagram header 410 identifies encapsulated RTP packet 406 as being generated from a real-time A/V conferencing application 301, callout driver 326 may determine that the RTP packet is an A/V packet. In response to callout driver 326 determining that RTP packet 406 is an A/V packet, the callout driver may increment an RTP packet count for the particular application that generated the RTP packet.

In certain examples, another field of IP/UDP packet 402/404 that callout driver 326 may inspect is data field 412. In this example, conferencing applications 310 may generate data associated with any suitable identification (ID). For example, data field 412 may include a process ID, a mapping of process ID related to conferencing application 310, or the like. Callout driver 326 may determine conferencing application 310 associated with RTP packet 406 based on data field 412. In an example, callout driver 326 may determine a frequency of RTP packets 406 with the same ID in data field 412. If the frequency of RTP packets with the same ID is above a threshold, callout driver 326 may determine that the RTP packet is an A/V packet. In response to callout driver 326 determining that RTP packet 406 is an A/V packet, the callout driver may increment an RTP packet count for the particular application that generated the RTP packet.

In an example, callout driver 326 may perform one or more suitable operations based on the RTP packet count. For example, if the RTP packet count for a particular conferencing application 310 exceeds a threshold count, callout driver 326 may determine that the particular conferencing application has an in-progress A/V session and provide an RTP session signal 340 to optimizer application 312. In certain examples, RTP session signal 340 may include any suitable data for the in-progress session including, but not limited to, data for information associated with particular conferencing application 310 that generated RTP packet 406, and a network packet type for the RTP packet.

In response to receiving RTP session signal 340, processor 300, via optimizer application 312, may compare the data associated with RTP packet 406 and conferencing application 310 that generated the RTP packet with configured network policies stored in a memory, such as memory 204 of FIG. 2. In an example, the configured network policies may include any suitable data to determine what applications should have network bandwidth optimized. For example, the configured network policies may include a list of applications, such as conferencing application 310, and an indication of whether RTP packets 406 for that particular application should be prioritized in a limited network bandwidth environment.

In an example, the network policies may be configured in any suitable manner. For example, the network policies may be configured in a default manner, such as any conferencing application 310 is prioritized, a particular conferencing application being prioritized over a different conferencing application, or the like. In certain examples, the network policies may also be set or changed from the default configuration based on IP selections, user selections, or the like.

Processor 300, via optimizer application 312, may determine the network policy for RTP packet 406, and may provide an optimize signal 342 to callout driver 326. In an example, optimize signal 342 may indicate any suitable data for prioritizing RTP packet 326. In certain examples, optimizer application 312 may periodically receive the information for conferencing application 310 and may determine whether the RTP session for the conferencing application is still active. In response to the RTP A/V session no longer being active, optimizer application 312 may provide optimize signal 342 to callout driver 326 and the optimize signal may indicate that RTP packets from conferencing application 310 should no longer be prioritized. Optimizer application 312 may perform the operations disclosed above to provide on-demand optimizing of RTP packets.

In response to optimize signal 342, callout driver 326 may determine whether RTP packet 406 may be optimized or prioritized. For example, if optimize signal 342 indicates that RTP packet 406 should not be optimized, callout driver 326 may provide this information to network stack 320. Network stack 320 may utilize the information for RTP packet 406 to determine not to prioritize the order in which the RTP packet is provided to network hardware device 324 for transmission to another device. If optimize signal 342 indicates RTP packet 406 should be optimized, callout driver 326 may provide this information to network stack 320. In an example, network stack 320 may utilize the information for RTP packet 406 to determine to prioritize the order in which the RTP packet is provided to network hardware device 324 for transmission to another device.

As described above, network stack 320 and/or network hardware device 324 may utilize the optimization or priority information for RTP packet 406 to control how the RTP packet is handled with respect to other packets to be transmitted by the network hardware device. The prioritization of RTP packet 406 encapsulated within IP/UDP packet 402/404 may enable an information handling system, such as information handling system 200 of FIG. 2, to provide a user with a high-quality experience in for A/V during an active session of the particular conferencing application 310. While the prioritization of a single RTP packet 406 has been disclosed herein, each RTP packet received by network stack 320 is inspected and analyzed to determine a prioritization for that RTP packet. In an example, each RTP packet may be inspected in substantially the same manner as described herein for RTP packet 406.

Figure 5:
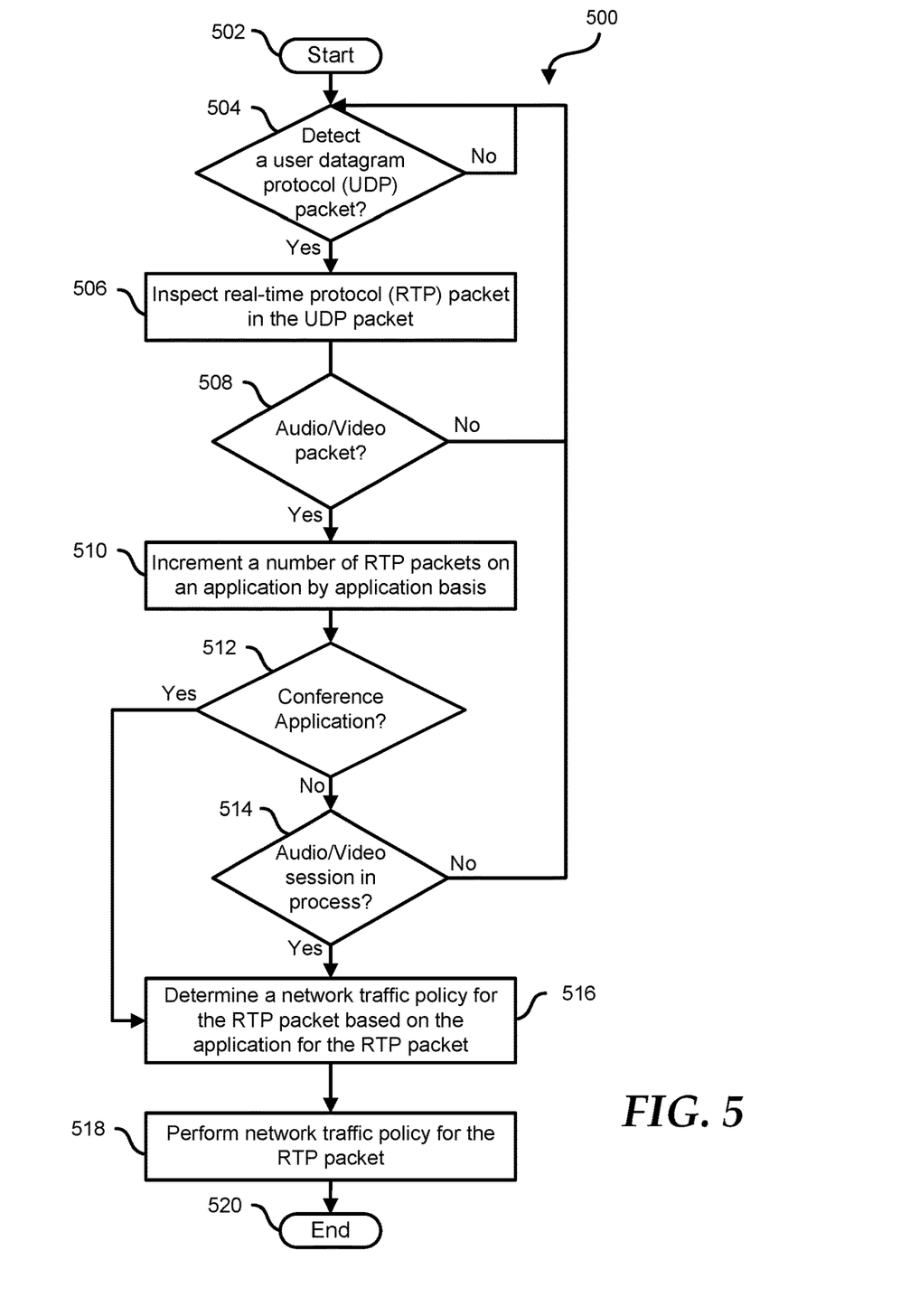
FIG. 5 is a flow diagram of a method for determining and performing a network traffic policy for a real-time protocol packet according to at least one embodiment of the present disclosure.

FIG. 5 is a flow diagram of a method for determining and performing a network traffic policy for a real-time protocol packet according to at least one embodiment of the present disclosure, starting at block 502. It will be readily appreciated that not every method step set forth in this flow diagram is always necessary, and that certain steps of the methods may be combined, performed simultaneously, in a different order, or perhaps omitted, without varying from the scope of the disclosure. FIG. 5 may be employed in whole, or in part, by information handling system 100 depicted in FIG. 1, information handling system 200 in FIG. 2, or any other type of system, controller, device, module, processor, or any combination thereof, operable to employ all, or portions of, the method of FIG. 5.

At block 504, a determination is made whether a UDP packet has been detected. In an example, the UDP packet may be encapsulated within an IP datagram packet and may be utilized to provide real-time data traffic within an information handling system. The real-time data traffic may be any suitable data including, but not limited to, audio data and video data for an A/V conference.

In response to the UDP packet being detected, a RTP packet is inspected. In an example, the RTP packet may be encapsulated within the UDP packet at block 506. The RTP packet may include any suitable data including, but not limited to, audio data and video data. In certain examples, the RTP packet may be inspect to determine an application that generated the packet. For example, an A/V conferencing application may generate the RTP packet.

At block 508, a determination is made whether the RTP packet is a real-time A/V packet. In an example, a callout driver may determine if the RTP packet is a real-time A/V packet. The callout driver may utilize any suitable field within the packet to determine whether RTP packet is an A/V packet. For example, callout driver may inspect payload type field to determine whether this field indicates that the RTP packet is an A/V packet. The callout driver may also utilize an RTP payload to determine whether RTP packet is an A/V packet for an in-progress A/V conference session. In an example, the callout driver may inspect the RTP payload to determine whether RTP packet includes an audio RTP session and a video RTP session. The callout driver may also inspect other fields of the UDP packet including, but not limited to, an UDP header, an IP datagram header, and a data field in the IP datagram packet.

If the RTP packet is not a real-time A/V packet, then the flow continues as stated above at block 504. If the RTP packet is a real-time A/V packet, then a number of RTP packets incremented on an application by application basis at block 510. At block 512, a determination is made whether an A/V conferencing application generated the RTP packet. In an example, any suitable device, such as a filter circuit, may be utilized to determine if an A/V conferencing application generated the RTP packet. The filter circuit may provide the RTP packet to different callout drivers based on the type of application that generated the packet. If the application is an A/V conferencing application, the flow continues as stated above at block 516. If the application is not an A/V conferencing application a determination is made whether an A/V session is in-progress at block 514. In an example this determination may be made in any suitable manner, including determining whether a number of real-time A/V packets for a particular conferencing application is above a threshold. If an A/V session is not in-progress, the flow continues as stated above at block 504.

If an A/V session is in-progress, a network traffic policy is determined for the RTP packet based on the application that generated the packet at block 516. In an example, the network policy may be any suitable policy to control how the RTP packet is handled in a network stack and a network hardware device, including prioritizing the RTP packet over other packets in the network stack. At block 518, the network traffic policy is performed on the RTP packet in the network stack and the network hardware device, and the method ends at block 520.

Referring back to FIG. 1, the information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. An information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a network hardware device to transmit one or more Internet Protocol (IP) datagram packets, each of the IP datagram packets including a respective user datagram protocol (UDP) packet; and
   a processor to communicate with the network hardware device, the processor to:
     detect a UDP packet, wherein the UDP packet includes a real-time protocol (RTP) packet;
     inspect one or more fields of the RTP packet;
     determine whether an conferencing application generated the RTP packet;
     in response to the conferencing application generating the RTP packet, determine whether the RTP packet is a real-time audio/video packet;
     in response to the RTP packet being the real-time audio/video packet, determine whether a number of real-time audio/video packets for a particular application exceeds a threshold number;
     in response to the number of real-time audio/video packets for the particular application exceeding the threshold number, determine that an audio/video session is in-progress; and
     in response to the audio/video session being in-progress, determine a network traffic policy for the RTP packet;
   the network hardware device to transmit the UDP packet encapsulating the RTP packet based on the determined network traffic policy.

2. The information handling system of claim 1, wherein the processor further to filter the RTP packet based on a type of application that generated the RTP packet, and to provide the RTP packet to different callout drivers based on the type of application.

3. The information handling system of claim 1, wherein the fields of the RTP packet include a payload type field.

4. The information handling system of claim 3, wherein the determination of whether the RTP packet is the audio/video packet further includes: the processor to determine whether the payload type field includes data for an audio/video encoding scheme; and in response to the payload type field including data for an audio/video encoding scheme, the processor to determine that the RTP packet is the audio/video packet.

5. The information handling system of claim 1, wherein the one or more fields of the RTP packet includes a RTP payload field.

6. The information handling system of claim 5, wherein the determination of whether the RTP packet is the audio/video packet further includes: the processor to determine whether the RTP payload field includes data for both an audio RTP session and a video RTP session; and in response to the RTP payload field including the data for both the audio RTP session and the video RTP session, the processor to determine that the RTP packet is the audio/video packet.

7. The information handling system of claim 1, wherein the determined network traffic policy indicates that the RTP packet is prioritized for transmission by the network hardware device.

8. The information handling system of claim 1, wherein the processor further to: determine that the audio/video session is no longer in-progress; and end the network traffic policy for RTP packets from the conferencing application.

9. A method comprising:
   detecting, by a processor, a UDP packet, wherein the UDP packet includes a real-time protocol (RTP) packet;
   inspecting one or more fields of the RTP packet;
   determining whether an conferencing application generated the RTP packet;
   in response to the conferencing application generating the RTP packet, determining whether the RTP packet is a real-time audio/video packet;
   in response to the RTP packet being the real-time audio/video packet, determining whether a number of real-time audio/video packets for a particular application exceeds a threshold number;

in response to the number of real-time audio/video packets for the particular application exceeding the threshold number, determining that an audio/video session is in-progress;

in response to the audio/video session being in-progress, determining, by the processor, a network traffic policy for the RTP packet; and transmitting, by a network hardware device, the UDP packet encapsulating the RTP packet based on the determined network traffic policy.

10. The method of claim 9, further comprising:
filtering the RTP packet based on a type of application that generated the RTP packet; and
providing the RTP packet to different callout drivers based on the type of application.

11. The method of claim 9, wherein the one or more fields of the RTP packet includes a payload type field.

12. The method of claim 11, wherein the determining of whether the RTP packet is the audio/video packet further includes:
determining whether the payload type field includes data for an audio/video encoding scheme; and
in response to the payload type field including data for an audio/video encoding scheme, determining that the RTP packet is the audio/video packet.

13. The method of claim 9, wherein the one or more fields of the RTP packet includes a RTP payload field.

14. The method of claim 13, wherein the determining of whether the RTP packet is the audio/video packet further includes:
determining whether the RTP payload field includes data for both an audio RTP session and a video RTP session; and
in response to the RTP payload field including the data for both the audio RTP session and the video RTP session, determining that the RTP packet is the audio/video packet.

15. The method of claim 9, wherein the determined network traffic policy indicates that the RTP packet is prioritized for transmission by the network hardware device.

16. The method of claim 9, further comprising:
determining that the audio/video session is no longer in-progress; and
ending the network traffic policy for RTP packets from the conferencing application.

17. A method comprising:
detecting, by a processor, a UDP packet, wherein the UDP packet includes a real-time protocol (RTP) packet;
inspecting one or more fields of the RTP packet;
filtering the RTP packet based on a type of application that generated the RTP packet;
providing the RTP packet to different callout drivers based on the type of application;
in response to the type of application being a conferencing application:
providing the RTP packet to a first callout driver; and
determining whether the RTP packet is a real-time audio/video packet;
in response to the RTP packet being the real-time audio/video packet, determining whether a number of real-time audio/video packets for a particular application exceeds a threshold number;
in response to the number of real-time audio/video packets for the particular application exceeding the threshold number, determining that an audio/video session is in-progress;
in response to the audio/video session being in-progress, determining, by the processor, a network traffic policy for the RTP packet, wherein the determined network traffic policy indicates that the RTP packet is prioritized for transmission by the network hardware device; and
transmitting, by a network device, the UDP packet encapsulating the RTP packet based on the determined network traffic policy.

18. The method of claim 17, wherein the determining of whether the RTP packet is the audio/video packet further includes:
determining whether a payload type field of the RTP packet includes data for an audio/video encoding scheme; and
in response to the payload type field including data for an audio/video encoding scheme, determining that the RTP packet is the audio/video packet.

19. The method of claim 17, wherein the determining of whether the RTP packet is the audio/video packet further includes:
determining whether a RTP payload field of the RTP packets includes data for both an audio RTP session and a video RTP session; and
in response to the RTP payload field including the data for both the audio RTP session and the video RTP session, determining that the RTP packet is the audio/video packet.

20. The method of claim 17, wherein the determined network traffic policy indicates that the RTP packet is prioritized for transmission by the network hardware device.

* * * * *